United States Patent [19]

Matsushita et al.

[11] Patent Number: 5,106,682
[45] Date of Patent: Apr. 21, 1992

[54] FLUORORESIN-COATED ARTICLE

[75] Inventors: Nobutaka Matsushita; Hideki Kashihara; Fumio Matsuyama; Katsuya Yamada, all of Osaka, Japan

[73] Assignee: Sumitomo Electric Industries Ltd., Osaka, Japan

[21] Appl. No.: 497,168

[22] Filed: Mar. 22, 1990

[30] Foreign Application Priority Data

Mar. 25, 1989 [JP] Japan ................................. 1-72269
Nov. 20, 1989 [JP] Japan ................................. 1-301169

[51] Int. Cl.⁵ .......................... B32B 5/16; B32B 27/08
[52] U.S. Cl. .................................... 428/324; 428/333; 428/336; 428/419; 428/421; 428/422; 428/473.5; 428/474.4; 428/476.9
[58] Field of Search .............. 428/422, 901, 421, 324, 428/336, 333, 473.5, 474.4, 476.9, 419

[56] References Cited

U.S. PATENT DOCUMENTS 4,180,609 12/1979 Vassiliou .
4,769,270 9/1988 Nagamatsu et al. ............ 428/901 X

FOREIGN PATENT DOCUMENTS 0022256 1/1981 European Pat. Off. .
0022257 1/1981 European Pat. Off. .
0254269 1/1988 European Pat. Off. .
0343015 11/1989 European Pat. Off. .

OTHER PUBLICATIONS

Patent Abstracts of Japan, vol. 5, No. 180 (C-79) [852], Nov. 19, 1981; & JP-A-56 103 257 (Daikin Kogyo K.K.) Aug. 18, 1981.

*Primary Examiner*—Thomas J. Herbert, Jr.
*Attorney, Agent, or Firm*—Sughrue, Mion, Zinn, Macpeak & Seas

[57] ABSTRACT

A fluororesin-coated article comprising an aluminum or aluminum alloy base having a surface which has been finely roughened by electrochemical etching or chemical etching;
(1) a first fluororesin layer provided on the roughened surface of the base and containing an inorganic filler and a filler comprising a heat-resistant polymer; and
(2) a second fluororesin layer provided on the first fluororesin layer and containing substantially no filler.

9 Claims, 2 Drawing Sheets

FLUORORESIN-COATED ARTICLE

FIELD OF THE INVENTION

The present invention relates to a fluororesin-coated article. More particularly, it relates to a fluororesin-coated article for use as the inner pot of, for example, a rice cooker-warmer, cooked-rice warmer, rice cooker, rice-cake maker, or the like. The fluororesin-coated article provided by the present invention not only has a good appearance, specifically discoloration resistance, a wide range of color selection, etc., which have not so far been attained, but also possesses improved wear resistance (scratch resistance), press-forming resistance, nontacky properties and corrosion resistance.

BACKGROUND OF THE INVENTION

Fluororesins have superior nontacky properties and chemical resistance and, hence, are extensively used in the food industry, the electrical and machine industry, etc. Applications thereof include cooking utensils such as frying pans, pots, hot plates, and the inner pots of rice cooker-warmers, food vessels or containers, and electrical products.

There are the following three conventional techniques mainly employed in the above field.

(1) A technique in which the surface of an aluminum or aluminum alloy base is etched and then coated with a dispersion of polytetrafluoroethylene (PTFE), the coating is dried and baked, and a formed article, for example a pot, is obtained from the resulting coated base by press forming.

(2) A technique in which the surface of an aluminum or aluminum alloy base is etched, a tetrafluoroethyleneethylene copolymer (ETFE) film is then laminated to the etched surface, and a formed article, for example a pot, is obtained from the resulting laminated base by press forming.

For example, in the case of pots for boiling rice or containing boiled rice (hereinafter, referred to as "rice pots"), the inner surface of the pots is coated with a fluororesin such as those mentioned above because boiled rice is highly apt to adhere to the inside of the pots.

Technique (2) above is inferior to technique (1) above in that ETFE is poor in heat resistance, so that technique (1) has been far more often employed than technique (2).

(3) A technique that is substantially the same as (1) above except that a filler such as carbon is incorporated in the PTFE.

The above-described conventional techniques, however, have had the following problems.

(A) Since PTFE and ETFE are soft resins and are translucent or transparent, articles coated with these fluororesins are defective in that the coatings are prone to receive scratches and that in the case where such articles are used, for example, as rice pots, the aluminum base is discolored due to the penetration of steam, etc. during use. Because of such poor scratch resistance and the discoloration problem, these products have short lifetimes.

(B) Articles produced by the above technique (3) are defective in nontacky properties and corrosion resistance (e.g., the coatings are apt to have pinholes) and, hence, are not used as rice pots.

A further problem accompanying the conventional techniques from the standpoint of color is that the coatings of the conventional fluororesins mainly are colorless and transparent to allow the colors of the bases to be seen therethrough or are monochromatic such as white, gray, or black, and at the most, they are of metallic colors obtained by imparting metallic luster to these monochromatic colors.

In the field of consumer products, particularly those for home use, there have recently been increasing needs of a wide range of color selection, and color, which has been thought to be a second-order function, is becoming an indispensable function. This can be seen in recently marketed refrigerators which can be ordered with particular colors.

Coloring of fluororesin coatings, however, has the following problem. Since there are almost no good solvents for fluororesins due to their excellent chemical resistance, fluororesin-coated articles are obtained by a process in which fluororesins in the form of an aqueous dispersion or a powder are coated on substrates and then baked at high temperatures. In such coating processes, organic colorants, e.g., dyes, cannot be used because the colorants are denatured by heat.

Coloring with inorganic pigments such as red iron oxide and ultramarine, on the other hand, has problems that if inorganic pigments are used in small amounts, the fluororesin coatings cannot be sufficiently colored, while if the pigments are incorporated in large proportions, important properties of the fluororesin coatings, such as adhesion to the substrates and surface-nontacky properties, are greatly impaired.

For the above reason, carbon black and titanium oxide have been incorporated, which match with the colors of the base substrates to give good colors even if they are incorporated in such small amounts that the above-mentioned important properties of fluororesin coatings are not impaired greatly. Thus, monochromatic colors only, such as white, gray and black, have so far been obtained by incorporation of carbon black and titanium oxide.

On the other hand, in the case of fluororesin compositions coated on articles that are required to have wear resistance, such as frying pans, improved wear resistance of the coatings has been attained by incorporation of mica which has been practically used in rubbing materials for a long time. Such articles have metallic tones due to the secondary effect of mica. However, where mica only is incorporated as a filler, considerable unevenness of color occurs in some coating techniques if the thicknesses of the coatings are not uniform, because the opacifying power of mica as a pigment is insufficient. Therefore, mica has commonly been used in combination with a metal powder, silica, alumina, carbon, titanium oxide or the like.

JP-A-52-10386 and International Publication JP Sho-56-501277 disclose a method for attaining both wear resistance and nontacky properties, which comprises forming a base coating comprising a fluororesin and incorporated therein mica, pigment-coated mica, etc. and then coating this base coating with a fluororesin only or with a fluororesin composition comprising a fluororesin and a reduced proportion of mica. (The term "JP-A" as used herein means an "unexamined published Japanese patent application".) However, articles produced by the above method have been found, by the present inventor, to have the following problem. The coatings on these articles have insufficient adhesion to the substrates and, hence, where such articles are used as the inner pots of rice cooker-warmers or other rice pots, which are required to have outstanding corrosion resistance, the metal substrates corrode due to water and salts penetrated through a small number of minute defects present in the coating films, and the resulting metal oxides lift up the coating films to damage the pots.

In an attempt to improve such insufficient adhesion, JP-A-56-103257 proposes to incorporate a heat-resistant binder. However, this technique has a problem that not only satisfactory adhesion has not been obtained, but the nontacky properties are impaired by the incorporation of the heat-resistant binder.

The present inventor found that improved coated articles can be obtained by combining the above-described three techniques to produce a fluororesin-coated article by forming a base coating comprising a fluororesin and incorporated therein mica and a heat-resistant binder and then coating this base coating with a fluororesin only. Although the coated article thus obtained had been considerably improved compared to conventional ones, the adhesion of the coating to the substrate was still insufficient.

For the purpose of obtaining coated articles of a variety of colors, chromatic inorganic pigments have been tried. However, if they are used in sufficient amounts to obtain desired coloring properties, the adhesion of the resulting coatings to the substrates is weakened even more. Hence, coated articles of a variety of colors that can be put to practical use have not yet been obtained.

Furthermore, when coated substrates are subjected, in particular, to press forming to produce inner pots for rice cooker-warmers or the like, the coating films are stretched by pressing and, as a result, pinholes, peeling of the coating films, and breaking of inner part of the coating films are apt to occur. Therefore, except those obtained by coating electrochemically or chemically etched aluminum or aluminum alloy bases with a fluororesin containing no filler, none of the conventional coated articles has been able to be put to practical use.

SUMMARY OF THE INVENTION

Accordingly, an object of the present invention is to provide a fluororesin-coated article which satisfies all of wear resistance (scratch resistance), press-forming resistance (sufficient stretchability of the coating film to follow up severe press forming), tenacious adhesion of the coating to the base plate to maintain corrosion resistance, and surface-nontacky properties, and which at the same time is excellent in appearance because of its good discoloration resistance, a wide range of color selection, etc., which have not so far been attained with conventional fluororesin-coated articles.

Other objects and effects of the present invention will be apparent from the following description.

The present invention relates to, as a first embodiment, a fluororesin-coated article comprising an aluminum or aluminum alloy base having a surface which has been finely roughened by electrochemical etching or chemical etching;

(1) a first fluororesin layer provided on the roughened surface of the base and containing an inorganic filler and a filler comprising a heat-resistant polymer; and (2) a second fluororesin layer provided on the first fluororesin layer and containing substantially no filler.

The present invention also relates to, as a second embodiment, a fluororesin-coated article comprising an aluminum or aluminum alloy base having a surface which has been finely roughened by electrochemical etching or chemical etching;

(1) a first fluororesin layer provided on the roughened surface of the base and containing from 1 to 10% by weight, based on the amount of the solid contents in the first fluororesin layer, of mica having an average particle size of from 5 to 200 μm and the surface of which is coated with an inorganic pigment, and from 1 to 10% by weight, based on the amount of the solid contents, of a filler comprising a heat-resistant polymer, the total amount of all the fillers in the first fluororesin layer being not more than 15% by weight based on the amount of the solid contents; and (2) a second fluororesin layer provided on the first fluororesin layer and containing substantially no filler.

DETAILED DESCRIPTION OF THE INVENTION

The term "containing substantially no filler" herein means that the amount of the filler(s) contained is below 0.5% by weight based on the amount of the fluororesin.

The above first embodiment of the present invention include at least the following:

(1A) A fluororesin-coated article according to the above first embodiment of the present invention in which the inorganic filler in the first fluororesin layer is mica and is contained in an amount of from 0.5 to 10 parts by weight per 100 parts by weight of the fluororesin contained in the first fluororesin layer;

(1B) A fluororesin-coated article according to the above first embodiment of the present invention in which the heat-resistant polymer in the first fluororesin layer is selected from the group consisting of polyamideimide (PAI), polyimide (PI), polyphenylene sulfide (PPS), polyethersulfone (PES) and mixtures thereof, the amount of such heat-resistant polymer being 1 part by weight or more per 100 parts by weight of the fluororesin contained in the first fluororesin layer; and (1C) A fluororesin-coated article according to the above first embodiment of the present invention in which the inorganic filler in the first fluororesin layer is mica and is contained in an amount of from 0.5 to 10 parts by weight per 100 parts by weight of the fluororesin contained in the first fluororesin layer and the heat-resistant polymer is selected from the group consisting of a polyamideimide (PAI), polyimide (PI), polyphenylene sulfide (PPS), polyethersulfone (PES) and mixtures thereof, the amount of the heat-resistant polymer being 1 part by weight or more per 100 parts by weight of the fluororesin contained in the first fluororesin layer.

The first embodiment of the present invention is explained below in detail.

The present inventors have conducted intensive studies in order to overcome the above-described conventional problems, and as a result, the present invention has been completed.

Figure 1:
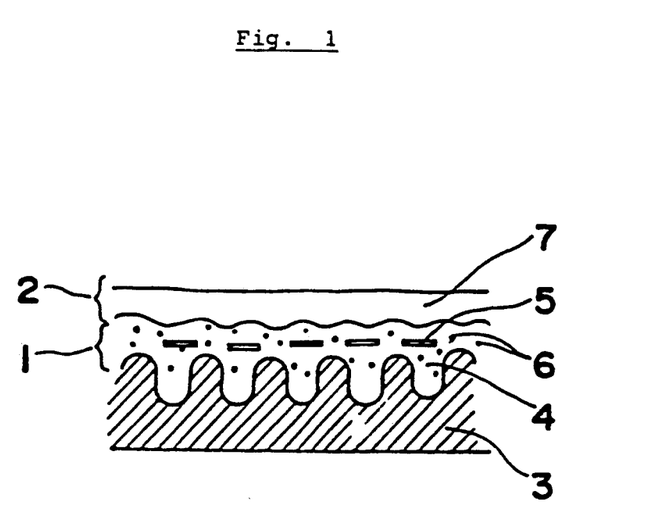
FIG. 1 is a diagrammatic cross-sectional view of a fluororesin-coated article according to the present invention.

The characteristic feature of the present invention resides in that, as shown in FIG. 1, a two-layer fluororesin coating is provided on the surface of an aluminum (hereinafter including aluminum alloy) base (3) which has been finely roughened by electrochemical etching or chemical etching, the two-layer fluororesin coating being composed of a first fluororesin layer (1) containing an inorganic filler and a filler comprising a heat-resistant polymer for coloring the aluminum base or hiding the base and, as well as for improving wear resistance (scratch resistance) and a second fluororesin layer (2) containing substantially no filler (i.e., the filler content being below 0.5% by weight based on the amount of the fluororesin).

In FIG. 1, reference numeral 4 denotes a fluororesin, 5 mica for example, 6 polyamideimide for example, and 7 a fluororesin.

In other words, the characteristic feature of the present invention resides in that the first fluororesin layer eliminates the appearance problem that aluminum bases suffer discoloration and the mechanical problem that fluororesin suffers scratches, and further, the second fluororesin layer serves to impart surface-nontacky properties.

The fillers for the first fluororesin layer may be selected from inorganic fillers, e.g., mica, carbon, titanium oxide and iron oxide, and from heat-resistant polymers, e.g., polyamideimide (PAI), polyimide (PI), polyphenylene sulfide (PPS), polyethersulfone (PES) and mixtures thereof. However, in view of the object of the present invention, it is preferred that the following points should be considered in filler selection:

(1) a filler free of food sanitation problem should be selected; and (2) preferred is one those providing a composition having good applicability, i.e., those having good dispersibility into a fluororesin, specifically one having a specific gravity of about 6 or less.

Incorporation of such fillers in a fluororesin serves to color the fluororesin thereby to make discoloration of the aluminum base inconspicuous or to hide the base. Such opacifying effect is brought about by the color of the filler itself in the case of the inorganic filler, while in the case of the heat-resistant polymer, its opacifying effect is produced by the color of the filler itself and/or by the coloring of the filler at a high temperature employed for sintering the fluororesin. In addition, incorporation of the fillers also serves to improve wear resistance.

The amount of the inorganic filler incorporated is preferably from 0.5 to 10 parts by weight per 100 parts by weight of the fluororesin. If the amount thereof is below 0.5 part by weight, the base is not hidden sufficiently. If the amount thereof exceeds 10 parts by weight, the adhesion of the first fluororesin layer to the base (which has been etched) becomes poor.

The incorporated amount of the heat-resistant polymer is preferably 1 part by weight or more per 100 parts by weight of the fluororesin. If the amount thereof is below 1 part by weight, a sufficient coloring and hiding effect cannot be obtained.

The second fluororesin layer is required to contain substantially no filler for the purpose of attaining good nontacky properties. Although many conventional fluororesin-coated frying pans and the like employ filler-containing outermost layers, the second fluororesin layer according to the present invention should contain substantially no filler because rice pots are required to have exceeding nontacky properties since boiled rice is highly apt to adhere to the pots as compared with those materials in frying pans and the like which are cooked together with oil and water.

As the inorganic filler for the first fluororesin layer, mica is preferred from the standpoint of wear resistance.

There are many kinds of mica according to components. Composition formulae for representative mica are as follows.

| muscovite: | $K_2Al_4(Si_3Al)_2O_{20}(OH)_4$ |
| phlogopite: | $K_2Mg_6(Si_3Al)_2O_{20}(OH)_4$ |
| biotite: | $K_2(MgFe^{2+})_6(Si_3Al)_2O_{20}(OH)_4$ |

Any of such mica may be used in the present invention.

Mica to be used may be coated with titanium for imparting luster to the final product to obtain a good appearance.

The amount of the mica incorporated in the first fluororesin layer is preferably in the range of from 0.5 to 10 parts by weight per 100 parts by weight of the fluororesin contained in the first fluororesin layer. If the amount thereof is below 0.5 part by weight, the effects of the present invention are lessened because the base cannot be sufficiently hidden and wear resistance also cannot be sufficiently improved. On the other hand, an amount of the mica exceeding 10 parts by weight is not preferable in that the fluororesin is less apt to come into anchorages in the etched surface of the base, resulting in poor adhesion to the aluminum base.

The heat-resistant polymer is preferably those withstanding temperatures as high as 380° to 400° C. at which the fluororesin is baked. Examples of such heat-resistant polymer include polyamideimides, polyimides, polyphenylene sulfides, and polyethersulfones. These may be used alone or in combination thereof.

Those heat-resistant polymers have not only the effects of hiding the base and improving wear resistance but the effect of improving adhesion to the base. That is, since the heat-resistant polymers show good adhesion to aluminum surfaces, a decrease in adhesion due to incorporation of an inorganic filler can be counterbalanced by combined use of such a heat-resistant polymer with the inorganic filler.

Of the above-mentioned heat-resistant resins, polyamideimides are particularly preferred from the standpoints of wear resistance and corrosion resistance.

The "aluminum or aluminum alloy base" used in the present invention includes an aluminum base, an aluminum alloy base, or a laminated plate having an uppermost layer of aluminum or its alloy. This is because physically surface-roughening treatments such as blasting are insufficient to obtain a finely roughened surface essential for attaining the object of the present invention and a sponge-like roughened surface, adhesion to which is possible by means of an anchoring effect, should be formed by electrochemical etching or chemical etching. Because for obtaining such a roughened surface, aluminum or an aluminum alloy is well suited as the material constituting the base surface.

It is, of course, possible to conduct electrochemical etching in combination with blasting or chemical etching. It is preferable that after the surface of the base is thus etched, a hard Alumite layer be formed on the etched surface by anodic oxidation, because wear resistance and corrosion resistance are improved even more.

In any event, the present invention is accomplished only when the composition of the first fluororesin layer and the construction of the fluororesin-coated article, both described above, are combined with the etched aluminum base.

The above-described fluororesin-coated article according to the first embodiment of the present invention can be produced as follows.

On the roughened surface of an aluminum base, a fluororesin containing the fillers described above is coated to form the first fluororesin layer. Examples of the coating methods include spray coating, roll coating, spin coating, and the like, and any of these may be employed. After coating, the coating may be heated just to remove the water or may be heated to a baking temperature for the fluororesin (380° to 400° C.). Either heating method may be used.

On the first fluororesin layer thus formed, a fluororesin containing substantially no filler is then coated to form the second fluororesin layer. The coating method may be conducted by any of the above methods for forming the first fluororesin layer.

Examples of fluororesins that can be used in the first and second fluororesin layers of the present invention include polytetrafluoroethylene (PTFE), tetrafluoroethylenehexafluoropropylene copolymers (FEP), tetrafluoroethyleneperfluoroalkyl vinyl ether (PFA), ethylene-tetrafluoroethylene copolymers (ETFE), polychlorotrifluoroethylene (PCTFE), ethylene-chlorotrifluoroethylene copolymers (ECTFE) and mixtures thereof. Among these, PTFE, PFA and FEP are preferably used.

The fluororesin may be used not only in a resin powder form but also in the form of an aqueous fluororesin dispersion obtained by emulsion polymerization, a dispersion obtained by dispersing a fluororesin powder in an aqueous medium, an organosol of a fluororesin, or an emulsion of such an organosol in water.

The thickness of the coating, i.e., the first and second fluororesin layers, is preferably from 20 to 35 $\mu$m in total. If the thickness thereof is below 20 $\mu$m, pinholes are apt to result, while if it exceeds 35 $\mu$m, the coating is prone to develop cracks.

The above second embodiment of the present invention include at least the following:

(2A) A fluororesin-coated article according to the above second embodiment of the present invention in which the inorganic pigment coated on the mica is selected from the group consisting of the following (a) to (d):

(a) a transparent inorganic pigment, the coating of which has an optical thickness, which is the product of a geometrical thickness and a refractive index, of 0.2 to 0.4 $\mu$m, (b) an opacifying inorganic pigment, (c) a mixture of the transparent inorganic pigment and an opacifying inorganic pigment, and (d) a multilayer construction comprising a layer of a transparent inorganic pigment and a layer of an opacifying inorganic pigment each being coated on the mica in layers;

(2B) A fluororesin-coated article according to the above second embodiment of the present invention in which the heat-resistant polymer is a polyamideimide; and (2C) A fluororesin-coated article according to the above second embodiment of the present invention in which the opacifying inorganic pigment is iron oxide and the transparent inorganic pigment is titanium oxide.

The second embodiment of the present invention is explained below in detail.

The present inventor has further conducted intensive studies of the problems described hereinbefore, and as a result, it has now been found that coloring of the first fluororesin layer can be attained by incorporating 1% by weight or more, based on the amount of the solid contents, of mica coated with an inorganic pigment in place of incorporating generally employed inorganic fillers, which color the coating well only when they are incorporated in such large amounts that the elongation and nontacky properties of the coating film and the adhesion thereof to the base are greatly impaired.

In particular, it has been found that the coating can be chromatically colored when mica coated with one of the above-mentioned inorganic pigments (a) to (d) is used.

It has also been found that in order to obtain tenacious adhesion for maintaining corrosion resistance, an aluminum or aluminum alloy base, the surface of which has been finely roughened by electrochemical etching or chemical etching, should be used, a heat-resistant polymer, preferably a polyamideimide, should be used in an amount of 1% by weight or more as a heat-resistant filler, the inorganic pigment-coated mica used as a pigment should have an average particle size of 5 $\mu$m or more, and such mica should be incorporated in an amount of 10% by weight or less, preferably 7% by weight or less.

Furthermore, it has been found that in order to keep the elongation, i.e., elongation at break, of the coating film high to obtain press-forming resistance, the amount of the heat-resistant polymer incorporated should be 10% by weight or less based on the amount of the solid contents, and the total amount of all the fillers including the heat-resistant polymer and the inorganic pigment-coated mica should be not more than 15% by weight, preferably not more than 10% by weight, based on the solid contents.

It has still further been found that for obtaining nontacky properties and for repairing minute defects present in the first fluororesin layer, a fluororesin containing substantially no filler should be coated on the first fluororesin layer to form a second fluororesin layer, and that for preventing the surface of the second fluororesin layer from being roughened to have poor nontacky properties, the average particle size of the mica in the first fluororesin layer should be 200 $\mu$m or less.

Accordingly, it has been found that a fluororesin-coated article which enables a wide range of color selection so far been impossible and which has been improved in all of press-forming resistance, nontacky properties, and corrosion resistance can be obtained by combining all of the above-described requirements. Thus, the second embodiment of the present invention has been accomplished. Such fluororesin-coated article which simultaneously meets the above requirements comprises an aluminum or aluminum alloy base having a surface which has been finely roughened by electrochemical etching or chemical etching, a first fluororesin layer provided on the roughened surface of the base, and a second fluororesin layer provided on the first fluororesin layer and containing substantially no filler, the first fluororesin layer containing from 1 to 10% by weight, preferably from 1 to 7% by weight, based on the amount of the solid contents in the first fluororesin layer, of a mica having an average particle size of from 5 μm to 200 μm and the surface of which is coated with an inorganic pigment and from 1 to 10% by weight, based on the amount of the solid contents, of a heat-resistant polymer, the total amount of all the fillers in the first fluororesin layer being not more than 15% by weight, preferably not more than 10% by weight, based on the amount of the solid contents.

It has been found that a chromatically colored article, which is particularly preferable from the standpoint of appearance, can be obtained when the inorganic pigment coated on the mica is one of the above-mentioned (a) to (d).

In the second embodiment of the present invention, the particle size for mica is that obtained by optically measuring the sizes of mica particles dispersed in a liquid medium with a particle size distribution analyzer of the laser-beam diffraction type, and they correspond to the diameters of spheres having sectional areas equal to the maximum projected areas of the flaky mica particles.

The aluminum or aluminum alloy base used in the second embodiment of the present invention and preferred embodiments thereof may be those as described for the first embodiment of the present invention.

The mica incorporated in the first fluororesin layer and the surface of which is coated with an inorganic pigment has an average particle size of 5 to 200 μm, and the incorporated amount thereof is in the range of from 1 to 10% by weight, preferably from 1 to 7% by weight, based on the amount of the solid contents in the first fluororesin layer.

If a pigment-coated mica having an average particle size below 5 μm is incorporated in such an amount as to obtain a good color, sufficient adhesion of the resulting first fluororesin layer to the base cannot be obtained even when the base surface has been finely roughened and a heat-resistant polymer as a heat-resistant filler has been incorporated. On the other hand, use of a pigment-coated mica having an average particle size more than 200 μm is also not preferable in that the hiding power of the resulting first fluororesin layer is reduced optically, making it difficult to obtain a good color, and that the final fluororesin-coated article has impaired wear resistance and shows poor nontacky properties because the finished coating has a coarse surface.

For attaining both adhesion and coloring properties by use of the pigment-coated mica of 5 to 200 μm, it is incorporated in an amount in the range of from 1 to 10% by weight, preferably from 1 to 7% by weight, based on the amount of the solid contents, and further, sufficient adhesion to the base can be obtained only when the incorporation of the mica is combined with use of an electrochemically or chemically etched base and incorporation of the filler comprising a heat-resistant polymer in an amount of 1% by weight or more based on the amount of the solid components.

As the heat-resistant polymer, polyamideimide is preferably used, which is incorporated in an amount of 1 to 10% by weight based on the amount of the solid contents. Only when the incorporation of such a filler comprising heat-resistant polymer is combined with use of the above-described base plate and use of the above-described pigment-coated mica, which is incorporated in the specific amount and has the specific particle size, sufficient adhesion can be obtained.

The present inventor found that for obtaining press-forming resistance, the coating film is generally required to have an elongation (elongation at break) of at least about 100%, preferably about 150%. In order to obtain a fluororesin coating that meets the above requirement, the amount of the heat-resistant polymer incorporated therein should be 10% by weight or less based on the amount of the solid contents. It is also necessary that the total amount of all the fillers including the heat-resistant polymer and the pigment-coated mica should be not more than 15% by weight, preferably not more than 10% by weight, based on the amount of the solid contents.

The inorganic pigment coated on mica is not particularly limited as long as it is stable to the heat used to sinter the coated layer. Examples of the inorganic pigments include carbon black, iron hydroxide, iron oxide, iron ferrocyanide, chromium hydroxide, chromium oxide and titanium oxide. Among these, titanium oxide, iron oxide and a mixture thereof are preferred.

In the case where a transparent inorganic pigment, such as titanium oxide, is coated on mica in order to particularly obtain a chromatic color, the optical thickness of the pigment coating is preferably from 0.2 to 0.4 μm (optical thickness=geometrical thickness × refractive index), because chromatic coloring with such pigment necessitates interference of light. In the case where the inorganic pigment coated on mica is an opacifying pigment such as iron oxide, the thickness of the pigment coating is not particularly limited.

The inorganic pigment coating on mica may comprise a transparent and opacifying inorganic pigment, which may be in the form of a mixture thereof or may have been applied in layers to form a multilayer constitution. Such multilayer coating is preferable in that a variety of color tones are obtainable according to combinations of kind and thickness.

The mica that can be used herein includes many kinds according to components. Any of micas as described for the first embodiment of the present invention may be used in the second embodiment of the present invention.

Examples of fluororesins that can be used in the first and second fluororesin layers of the second embodiment of the present invention and preferred embodiments thereof may be those described for the first embodiment of the present invention.

The heat-resistant polymer incorporated in the first fluororesin layer is not limited. As the heat-resistant polymer, polyamideimide is preferred, but any of them such as those described for the first embodiment of the present invention may be used.

With respect to coloring, the following effects are brought about by the present invention.

In the case where the inorganic pigment coated on the mica is a transparent pigment and the optical thickness of the pigment coating is from 0.2 μm to 0.4 μm, purple, green, yellow, orange or red light passing through the inorganic pigment coating provides reflected light of complementary colors, i.e., yellow, red, purple, blue or green, by means of interference of the light passing through the transparent pigment coating.

Since titanium oxide-coated mica generally used for industrial applications has titanium oxide coatings with an optical thickness of about 0.14 μm, reflected lights are white or silver and, hence, unevenness of color becomes severe if the thickness of the first fluororesin layer varies greatly. In contrast, in the case of reflected lights of from yellow to green colors, such unevenness of color is diminished to give a better appearance.

In the case where the inorganic pigment coated on the mica is an opacifying pigment, or where it is a mixture of a transparent pigment and an opacifying pigment, or where it is a combination of a transparent pigment and an opacifying pigment which are coated in layers, the resulting coating assumes the color of the opacifying inorganic pigment and a better appearance free of unevenness of color is also obtained in these cases.

Particularly, in the case where the transparent inorganic pigment is titanium oxide, a beautiful color can be obtained because of the high transparency of the pigment, and further, the wear resistance of the final product is improved even more due to the high surface hardness of the pigment.

Iron oxide is preferable as the opacifying inorganic pigment in that a reddish brown color having high hiding power is obtained and the resulting coating assumes a beautiful wine red color with gloss.

The above-described fluororesin-coated article according to the second embodiment of the present invention can be produced in the same manner as for the first embodiment of the present invention.

As described above, the fluororesin-coated article of the first and second embodiments of the present invention has a sufficient coating film elongation to follow up press forming, and shows not only good corrosion resistance due to the tenacious adhesion between the base and the coating, but good surface-nontacky properties. In addition, the fluororesin-coated article is excellent in wear resistance, discoloration resistance, and a wide range of color selection. Therefore, since the coated article of the present invention is good in both appearance and property, it can be preferably used as the inner pot of a rice cooker-warmer or other rice pots, and is applicable to other cooking utensils and domestic articles including domestic electrical products in various fields in which good appearances as well as functions are required.

The present invention will be explained below in more detail by reference to the following Examples, but the present invention is not construed as being limited thereto.

EXAMPLE 1

As an aluminum base, an aluminum plate having a thickness of 2.5 mm ("ASB", manufactured by Kobe Steel, Ltd., Japan) was used.

Using the aluminum plate as an anode, electrochemical etching treatment of the aluminum plate was conducted in an aqueous solution of ammonium chloride at an electrical quantity of 25 C/cm$^2$ to finely roughen the surface of the plate. On this surface, a resin composition composed of 100 parts by weight of PTFE, 3.0 parts by weight of PAI and 2.0 parts by weight of mica was coated and then baked to form a first fluororesin layer. On this first layer, a dispersion of PTFE (D-1F, manufactured by Daikin Industries, Ltd., Japan) containing no filler was coated, dried to remove the water, and then baked at 400° C. for 10 minutes, thereby forming a second fluororesin layer. The application of the above coatings was performed at a dry thickness of 15 μm for each layer, with the total thickness of the first and second layer being 30 μm.

The coated plate thus obtained was press-formed to obtain a rice pot according to the present invention.

For the purpose of comparison, the same surface-etched aluminum plate was coated with only one fluororesin layer which was the same as the above second fluororesin layer at a thickness of about 30 μm (Comparative Example 1), or coated with only one fluororesin layer which was the same as the above first fluororesin layer at a thickness of about 30 μm (Comparative Example 2). The resulting plates were subjected to baking and press-forming in the same manner as above.

The rice pots thus obtained were evaluated for the following properties.

(1) Discoloration by Practical Use:

Using a commercial rice cooker-warmer, boiling of rice was repeated 300 times, and discoloration of the rice pot was evaluated in the following two grades.

A: Discoloration occurred.
B: Discoloration did not occur.

(2) Wear Resistance:

Wear resistance was evaluated according to the following method. A test piece having a diameter of 100 mm was cut out of the coated plate by punching. While this test piece was being heated, a stainless steel cleaning brush (trade name "Haipicalon Jumbo Tawashi #60") was pressed against the coating surface at a load of 2 Kg and rotated at a rotational speed of 200 rpm. The rotational abrasion test was thus performed, and the time at which the aluminum surface having metallic gloss appears was regarded as a measure of wear resistance and expressed in terms of revolution number for the brush.

(3) Adhesion Property:

The coating was crosscut with a knife at a depth reaching the base at intervals of 1 mm in such a manner as to result in 100 crosscut blocks. An adhesive cellophane tape was then pressed against the surface of the crosscut coating and peeled off immediately thereafter. This procedure was repeated 20 times, and after that, the number of coating blocks remaining out of the 100 blocks was counted.

Figure 2:
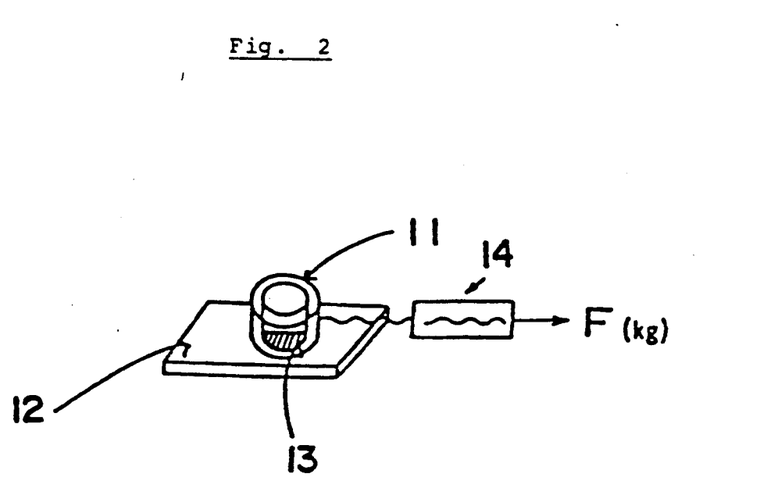
FIG. 2 illustrates a sugar adhesion test performed in the Examples of the present invention to evaluate nontacky properties.

(4) Nontacky Property:

Nontacky properties were evaluated by a sugar adhesion test as follows. The schematic view of the test is shown in FIG. 2.

A stainless-steel ring (11) having an inner diameter of 25.4 mm was placed on the surface of a sample (12) to be evaluated, and sugar (13) was placed in the ring on the sample and heated to melt the sugar. After cooling, a spring scale (14) was connected to the ring (11) and then pulled in a horizontal direction, and the load F (Kg) at the time when the ring was separated from the sample was measured. The better the nontacky properties, the smaller the load at that time.

(5) Corrosion Resistance:

In 1 liter of water is dissolved 25 g of a commercial "Japanese hotchpotch stock". Test pieces of the coated plates are placed in the above-prepared solution and heated therein at 90° to 100° C. for 100 hours. The test pieces are then taken out and their coating side is examined for corrosion, and evaluated in the following two grades.

A: Corrosion from the coated surface occurred.
B: Corrosion from the coated surface did not occur.

The results of the above evaluations are summarized in Table 1.

TABLE 1

|  | Discoloration | Wear resistance | Adhesion property | Nontacky property (kg) | Corrosion resistance |
|---|---|---|---|---|---|
| Example 1 | A | 50,000 | 100/100 | 2.0 | A |
| Comparative | B | 2,000 | 100/100 | 2.0 | A |

TABLE 1-continued

| | Dis­color­ation | Wear resis­tance | Adhesion property | Nontacky property (kg) | Corrosion resistance |
|---|---|---|---|---|---|
| Example 1-1 Comparative Example 1-2 | A | 48,000 | 100/100 | 7.0 | B |

As apparent from the results in Table 1, the fluorore­sin-coated articles of the present invention are excellent in discoloration properties of aluminum and in wear resistance (scratch resistance) compared to that of Com­parative Example 1-1 (conventional article).

The fluororesin-coated article of Comparative Exam­ple 1-2, which was a rice pot having only one fluorore­sin coating the same as the first fluororesin layer in Example 1, was inferior to the conventional article in nontacky properties and corrosion resistance.

EXAMPLE 2

Using the same aluminum plate as that used in Exam­ple 1, rice pots were produced and evaluated in the same manner as in Example 1 except that the amounts of PAI and mica incorporated in the first fluororesin layer were changed as shown in Table 2.

TABLE 2

| Amount of PAI (part*) | Amount of mica (part*) | Discoloration | Wear Resistance | Corrosion Resistance |
|---|---|---|---|---|
| 3.0 | 0.1 | A | 10,000 | A |
| 3.0 | 0.5 | A | 40,000 | A |
| 3.0 | 5.0 | A | 60,000 | A |
| 3.0 | 10.0 | A | 45,000 | A |
| 3.0 | 15.0 | A | 25,000 | A |
| 0.1 | 4.0 | A | 15,000 | A |
| 0.5 | 4.0 | A | 40,000 | A |
| 1.0 | 4.0 | A | 55,000 | A |
| 5.0 | 4.0 | A | 60,000 | A |
| 10 | 4.0 | A | 50,000 | A |
| 30 | 4.0 | A | 50,000 | A |

Note:
*The term "part" used herein means "part by weight".

As apparent from the results in Table 2 above, all the coated articles according to the present invention satis­fied all the properties as evaluated.

EXAMPLE 3

Using the same materials used in Example 1, rice pots were produced and evaluated in the same manner as in Example 1 except that the amount of PAI and the kind and amount of the inorganic filler incorporated in the first fluororesin layer were changed as shown in Table 3. The color of the coated surface was also determined.

TABLE 3

| Kind and amount of inorganic filler (part*) | Amount of PAI (part*) | Discoloration | Adhesion property | Color |
|---|---|---|---|---|
| Carbon 1.0 | 2.0 | A | 100/100 | Black |
| Carbon 1.0 | 0 | B** | 55/100 | Black |
| TiO$_2$ 5.0 | 3.0 | A | 100/100 | Light brown |
| TiO$_2$ 5.0 | 0 | B** | 30/100 | White |
| Fe$_2$O$_3$ 2.5 | 3.0 | A | 100/100 | Brown |
| Fe$_2$O$_3$ | 0 | B** | 45/100 | Brown |

Note:
*The term "part" used herein means "part by weight".
**Discoloration occurred and the peeling in the form of a small circle occurred on the bottom portion.

As apparent from the results in Table 3 above, if only an inorganic filler is incorporated into the first fluorore­sin layer, adhesion between the etched surface of the base and the first fluororesin layer is insufficient and the peeling in the form of a small circle occurs on the bot­tom portion upon repeated practical use. This is consid­ered to be because the fluororesin does not penetrate into the etched surface due to the presence of the filler and the anchor effect becomes insufficient. In the pres­ent invention, the adhesion between the etched surface and the fluororesin layer by the incorporation of the heat-resistant polymer so as to obtain an article having no problem upon practical use.

EXAMPLE 4

An aluminum alloy plate having a thickness of 2.0 mm ("MG-110-O", manufactured by Sumitomo Light Metal Industries, Ltd., Japan) was used as a base. Using this plate as an anode, electrochemical etching was performed in 3% aqueous NaCl solution at an electrical quantity of 20 Q/cm$^2$ to finely roughen the surface of the plate.

On the surface thus roughened, each of the fluorore­sin dispersions having compositions as shown in Table 4 was applied and baked to form a first fluororesin layer. Mica used herein has an average size of from 10 to 60 μm and has a titanium oxide coating having an optical thickness of 0.30 μm ("Iriodin 219" manufactured by Merck Japan Co., Ltd.). A pure fluororesin was then applied on the first layer and baked at 400° C. for 15 minutes to form a second fluororesin layer.

The thickness of the first layer was 25 μm and that of the second layer was 15 μm. Each of the thus-coated plates was press-formed to obtain an inner pot for rice cooker-warmer.

Comparative inner pots for rice cooker-warmer were prepared in the same manner as above except that the roughening method, the amount of PAI or the presence of the second fluororesin layer was varied as shown in Table 4.

The coated surfaces of all the pots had purple color with metallic luster.

Each of the inner pots thus obtained was evaluated for adhesion strength of the coating film, corrosion resistance, nontacky properties and press formability. The adhesion strength was evaluated by a test in which an FEP sheet was heat-adhered on the coated surface and the force required for peeling the coated layer in the direction of 180° was determined. The cor­rosion resistance was evaluated by a test in which a sample was immersed in a 25 wt % aqueous solution of NaCl and the time required for forming corrosion on the coated surface was determined. The nontacky prop­erty was evaluated by the same test as in Example 1. The press formability was evaluated by a test in which the formation of cracks upon press-forming to a pot was determined and evaluated in the following two grades: cracks did not form (A) and cracks formed (B).

The results obtained are shown in Table 5.

TABLE 4

|  | Roughening method | Amount of of mica (wt %) | Amount of PAI (wt %) | Presence of fluororesin layer |
|---|---|---|---|---|
| Example 4-1 | electrochemical | 4 | 3 | yes |
| Example 4-2 | electrochemical | 3 | 5 | yes |
| Example 4-3 | electrochemical | 8 | 6 | yes |
| Comparative Example 4-1 | electrochemical | 3 | 0.5 | yes |
| Comparative Example 4-2 | Blast | 3 | 5 | yes |
| Comparative Example 4-3 | electrochemical | 3 | 5 | no |

TABLE 5

|  | Adhesion strength (kg/cm) | Nontacky property (kg) | Press formability | Corrosion resistance (hour) |
|---|---|---|---|---|
| Example 4-1 | 2.6 | 2 | A | 550 |
| Example 4-2 | 3.5 | 2 | A | 600 |
| Example 4-3 | 2.8 | 2 | A | 500 |
| Comparative Example 4-1 | 1.3 | 2 | B | 150 |
| Comparative Example 4-2 | 0.8 | 2 | B | 5 |
| Comparative Example 4-3 | 3.5 | 6 | A | 250 |

As Table 5 shows, only the coated articles having the specific construction according to the present invention satisfy all the properties evaluated.

While the invention has been described in detail and with reference to specific embodiments thereof, it will be apparent to one skilled in the art that various changes and modifications can be made therein without departing from the spirit and scope thereof.

What is claimed is:

1. A fluororesin-coated article comprising an aluminum or aluminum alloy base having a surface which has been finely roughened by electrochemical etching or chemical etching;
   (1) a first fluororesin layer provided on the roughened surface of said base and containing an inorganic filler and a filler comprising a heat-resistant polymer; and
   (2) a second fluororesin layer provided on said first fluororesin layer and containing substantially no filler.

2. A fluororesin-coated article as claimed in claim 1, wherein said inorganic filler is mica and is contained in an amount of 0.5 to 10 parts by weight per 100 parts by weight of the fluororesin contained in said first fluororesin layer.

3. A fluororesin-coated article as claimed in claim 1, wherein said filler comprising a heat-resistant polymer is contained in an amount of 1 part by weight or more per 100 parts by weight of the fluororesin contained in said first fluororesin layer.

4. A fluororesin-coated article as claimed in claim 1, wherein said heat-resistant polymer is selected from the group consisting of polyamideimide, polyimide, polyphenylene sulfide, polyethersulfone and mixtures thereof.

5. A fluororesin-coated article as claimed in claim 1, wherein the inorganic filler is selected from the group consisting of mica, carbon, titanium oxide and iron oxide.

6. A fluororesin-coated article comprising an aluminum or aluminum alloy base having a surface which has been finely roughened by electrochemical etching or chemical etching;
   (1) a first fluororesin layer provided on the roughened surface of said base and containing from 1 to 10% by weight, based on the amount of the solid contents in said first fluororesin layer, of mica having an average particle size of from 5 to 200 μm and the surface of which is coated with an inorganic pigment, and from 1 to 10% by weight, based on the amount of said solid contents, of a filler comprising a heat-resistant polymer, the total amount of all the fillers in said first fluororesin layer being not more than 15% by weight based on the amount of said solid contents; and
   (2) a second fluororesin layer provided on said first fluororesin layer and containing substantially no filler.

7. A fluororesin-coated article as claimed in claim 6, wherein said heat-resistant polymer is polyamideimide.

8. A fluororesin-coated article as claimed in claim 6, wherein said inorganic pigment coated on the mica is selected from the group consisting of the following (a) to (d):
   (a) a transparent inorganic pigment, the coating of which has an optical thickness, which is the product of a geometrical thickness and a refractive index, of from 0.2 to 0.4 μm,
   (b) an opacifying inorganic pigment,
   (c) a mixture of said transparent inorganic pigment and an opacifying inorganic pigment, and
   (d) a multilayer constitution comprising a layer of said transparent inorganic pigment and a layer of an opacifying inorganic pigment each being coated on the mica.

9. A fluororesin-coated article as claimed in claim 8, wherein said opacifying inorganic pigment is iron oxide and said transparent inorganic pigment is titanium oxide.

* * * * *

UNITED STATES PATENT AND TRADEMARK OFFICE
CERTIFICATE OF CORRECTION

PATENT NO.   : 5,106,682
DATED        : April 21, 1992
INVENTOR(S)  : Nobutaka Matsushita, Hideki Kashihara, Fumio Matsuyama and Katsuya Yamada It is certified that error appears in the above-identified patent and that said Letters Patent is hereby corrected as shown below:

Column 12, line 14, delete "A: Discoloration occurred" and insert

--A: Discoloration did not occur--; and

Column 12, line 15, delete "B: Discoloration did not occur" and insert

--B: Discoloration occurred--.

Signed and Sealed this

Twenty-third Day of November, 1993

*Attest:*

BRUCE LEHMAN

*Attesting Officer*        *Commissioner of Patents and Trademarks*